United States Patent
Paquin et al.

(10) Patent No.: US 12,145,855 B2
(45) Date of Patent: Nov. 19, 2024

(54) PROCESS FOR POLISHING METAL CONTAMINANTS FROM AN ACIDIC SOLUTION COMPRISING SCANDIUM

(71) Applicant: RIO TINTO IRON AND TITANIUM CANADA INC., Sorel-Tracy (CA)

(72) Inventors: Michel Paquin, Bécancour (CA); Dimitrios Filippou, Mont-Royal (CA)

(73) Assignee: RIO TINTO IRON AND TITANIUM CANADA INC., Sorel-Tracy (CA)

( * ) Notice: Subject to any disclaimer, the term of this patent is extended or adjusted under 35 U.S.C. 154(b) by 901 days.

(21) Appl. No.: 17/053,299

(22) PCT Filed: May 3, 2019

(86) PCT No.: PCT/CA2019/050589
§ 371 (c)(1),
(2) Date: Nov. 5, 2020

(87) PCT Pub. No.: WO2019/213753
PCT Pub. Date: Nov. 14, 2019

(65) Prior Publication Data
US 2021/0163309 A1 Jun. 3, 2021

Related U.S. Application Data

(60) Provisional application No. 62/667,797, filed on May 7, 2018.

(51) Int. Cl.
*C01F 17/13* (2020.01)
*B01J 45/00* (2006.01)
*B01J 49/53* (2017.01)

(52) U.S. Cl.
CPC .............. *C01F 17/13* (2020.01); *B01J 45/00* (2013.01); *B01J 49/53* (2017.01)

(58) Field of Classification Search
CPC ............ C01F 17/13; B01J 49/53; B01J 45/00
See application file for complete search history.

(56) References Cited

U.S. PATENT DOCUMENTS

| 4,765,909 A | 8/1988 | Rourke et al. |
| 4,816,233 A | 3/1989 | Rourke et al. |
| (Continued) | | |

FOREIGN PATENT DOCUMENTS

| SU | 703929 A1 | 11/1983 |
| WO | 2016031699 A1 | 3/2016 |

OTHER PUBLICATIONS

Spedding, FH, et al., "The separation of rare earths by ion exchange. III. Pilot plant scale operations", Journal American Chemical Society, 69, 11, 2812-2818. (Year: 1947).*

(Continued)

*Primary Examiner* — Benjamin L Lebron
(74) *Attorney, Agent, or Firm* — Banner & Witcoff, Ltd.

(57) ABSTRACT

The present disclosure provides a process for polishing at least one metal contaminant from a stock solution comprising Sc comprising the steps of a) contacting the stock solution with an ion exchange resin capturing Sc and the at least one metal contaminate so as to produce a metal ion exchange resin complex, and b) scrubbing the metal resin complex with a scrubbing solution comprising a carboxylate ion, so as to produce a Sc ion exchange resin complex and a spent carboxylate solution, which can be treated by electrodialysis to regenerate the carboxylate ion required for scrubbing.

19 Claims, 3 Drawing Sheets

(56) References Cited

U.S. PATENT DOCUMENTS

| | | | |
|---|---|---|---|
| 4,965,053 | A | 10/1990 | Herchenroeder et al. |
| 9,102,999 | B2 | 8/2015 | Hartley et al. |
| 2014/0193317 | A1 | 7/2014 | Hartley et al. |

OTHER PUBLICATIONS

911 Metallurgist, "How to separate heavy rare earth elements", 911 Metallurgist. Mar. 7, 2018.*
Jul. 8, 2019—(WO) International Search Report & Written Opinion—PCT/CA2019/050589.
Buettner et al., "Bioinorganic Chemistry of Titanium," Chem. Rev., vol. 112, pp. 1863-1881 (2012).
Comba et al., "The Titanyl Question Revisited," Inorg. Chem., vol. 26, No. 8, pp. 1315-1323 (1987).
Li et al., "Separation and recovery of scandium and titanium from spent sulfuric acid solution from the titanium dioxide production process," Hydrometallurgy, vol. 178, pp. 1-6 (2018).
Wood et al., "The aqueous geochemistry of gallium, germanium, indium and scandium," Ore Geol. Rev., vol. 28, pp. 57-102 (2006).
Zebroski et al., "Thorium Complexes with Chloride, Fluoride, Nitrate, Phosphate and Sulfate," Am. Chem. Soc., vol. 73, No. 12, pp. 5646-5650 (1951).
Apr. 3, 2023—(JP) Office Action—App 2020-563712.
Dec. 17, 2021—(EP) Supplemental Serach Report and Written Opinion—App EP19799283.

* cited by examiner

PROCESS FOR POLISHING METAL CONTAMINANTS FROM AN ACIDIC SOLUTION COMPRISING SCANDIUM

CROSS-REFERENCE TO RELATED APPLICATIONS

This application is a U.S. National Stage application under 35 U.S.C. § 371 of International Application No. PCT/CA2019/050589, filed May 3, 2019, which claims priority to and the benefit of U.S. Provisional Application No. 62/667,797, filed May 7, 2018, and the present application claims the benefit of the filing date of both of these prior applications, which are incorporated by reference herein in their entireties.

TECHNICAL FIELD

The present description relates to the recovery of scandium and particularly to a process of removing/polishing low levels of metal contaminants from an acidic solution containing scandium.

BACKGROUND

Scandium may be present in low concentrations, e.g. 10 to 100 g/t, in many types of titanium dioxide feedstocks, including natural ores (ilmenite, rutile, etc.) and man-made products (titania slags, synthetic rutile, etc.).

Aqueous scandium-containing solutions are produced when upgrading titanium dioxide feedstock (ilmenite, titania slag, etc.), or when converting titanium dioxide feedstock to titanium dioxide pigment and to titanium metal. Examples of scandium-containing solutions may include spent hydrochloric acid from titanium dioxide feedstock upgrading operations, waste effluents from titanium pigment plants, waste effluents from titanium metal plants, etc. Such solutions can be treated by ion exchange resins to recover scandium.

However, some persistent structural similar metal impurity elements, such as titanium, thorium and zirconium are difficult to separate from the scandium-containing solutions. There is a need to reduce these similar impurities to lower levels so as to simplify and improve production of high purity (e.g., >99% wt.) scandium oxide.

SUMMARY

In one aspect there is provided a process for polishing at least one metal contaminant from a stock solution comprising Sc, the process comprising: a) contacting the stock solution with an ion exchange resin capturing Sc and the at least one metal contaminant so as to produce a metal ion exchange resin complex, and b) scrubbing the metal resin complex with a scrubbing solution comprising a salt having a carboxylate ion, so as to produce a Sc ion exchange resin complex and a spent carboxylate solution.

In another aspect there is provided a process described herein, wherein the carboxylate ion has a pKa in the range of 2.5 to 4.0.

In yet another aspect there is provided the process described herein, wherein the salt comprises an alcohol moiety in the vicinity of the carboxylate ion.

In still yet another aspect there is provided the process described herein, wherein the carboxylate ion is capable of binding the at least one metal contaminant so as to produce a soluble metal contaminant complex.

In still yet another aspect there is provided the process described herein, wherein prior to step a), the process comprises steps of: a-i) providing a first solution comprising Sc and the at least one metal contaminant and excess metal ions; a-ii) contacting the first solution with the ion exchange resin; a-iii) adding a strong acid to the ion exchange resin to dissolve and remove the excess metal ions from the ion exchange resin as an excess metal ion acid solution; and a-iv) forming the stock solution.

In still yet another aspect there is provided the process described herein, wherein the excess metal ions comprise at least one of iron (Fe), magnesium (Mg), aluminum (Al), calcium (Ca) and combinations thereof.

In still yet another aspect there is provided the process described herein, wherein the excess metal ions comprise Fe.

In still yet another aspect there is provided the process described herein, further comprising eluting Sc from the ion exchange resin complex with an alkaline solution producing a soluble Sc solution.

In still yet another aspect there is provided the process described herein, wherein the alkaline solution comprises a hydroxide, a carbonate, or a bicarbonate.

In still yet another aspect there is provided the process described herein, wherein the at least one metal contaminant is at least one of titanium (Ti), thorium (Th), and zirconium (Zr).

In still yet another aspect there is provided the process described herein, wherein the at least one metal contaminant is Ti.

In still yet another aspect there is provided the process described herein, wherein the salt is least one of citrate, tartrate, malate, malonate, lactate or combinations thereof.

In still yet another aspect there is provided the process described herein, wherein the salt is citrate.

In still yet another aspect there is provided the process described herein, wherein the ion exchange resin comprises at least one of the following functional groups: sulphonic acid, phosphonic acid, phosphinic acid, phosphonate monoethyl/diethyl esters, phosphonic acid/tertiary amines, phosphonic acid/dimethyl ester and combinations thereof.

In still yet another aspect there is provided the process described herein, wherein the temperature of the scrubbing solution is equal to or less than 65° C.

In still yet another aspect there is provided the process described herein, wherein the temperature of the scrubbing solution is between 20° C. and 65° C.

In still yet another aspect there is provided the process described herein, wherein the scrubbing solution has a pH between 3.0 and 4.0.

In still yet another aspect there is provided the process described herein, wherein the scrubbing solution has a pH of about 3.8.

In still yet another aspect there is provided the process described herein further comprising c) regenerating the scrubbing solution from the spent carboxylate solution.

In still yet another aspect there is provided the process described herein, wherein regenerating the spent carboxylate solution comprises: c-i) precipitating metal containing solids out of the spent carboxylate solution into an alkaline solution, c-ii) separating the metal containing solids from the spent carboxylate solution so as to form a clarified carboxylate solution, and c-iii) electrodialysing the clarified carboxylate solution so as to produce a regenerated carboxylate solution.

In still yet another aspect there is provided the process described herein, wherein the alkaline solution comprises a hydroxide.

In still yet another aspect there is provided the process described herein further comprising: c-iv) returning the regenerated carboxylate solution to step b) as the scrubbing solution.

In still yet another aspect there is provided a process for polishing at least one of titanium (Ti), thorium (Th), and zirconium (Zr) from a stock solution comprising Sc, the process comprising: a) contacting the stock solution with an ion exchange resin capturing Sc, and the at least one of Ti, Th, and Zr to produce a metal resin complex, and b) scrubbing the metal resin complex with a scrubbing solution comprising a salt having a citrate ion, so as to produce a Sc ion exchange resin complex and a spent carboxylate solution.

In still yet another aspect there is provided the process described herein, wherein the citrate ion binding the at least one Ti, Th, and Zr produces a soluble Ti, Th, and Zr contaminant complex.

In still yet another aspect there is provided the process described herein, wherein prior to step a), the process comprises steps of: a-i) providing a first solution comprising Sc and the at least Ti, Th, and Zr and excess metal ions; a-ii) contacting the first solution with the ion exchange resin; a-iii) adding a strong acid to the ion exchange resin to dissolve and remove the excess metal ions from the ion exchange resin as an excess ion acid solution, and a-iv) forming the stock solution.

In still yet another aspect there is provided the process described herein, wherein the excess ions are Fe, Mg, Al and combinations thereof.

In still yet another aspect there is provided the process described herein, wherein the excess metal ions comprise Fe.

In still yet another aspect there is provided the process described herein, further comprising eluting Sc from the ion exchange resin complex with an alkaline solution producing a soluble Sc solution.

In still yet another aspect there is provided the process described herein, wherein the alkaline solution comprises a hydroxide, a carbonate, or a bicarbonate.

In still yet another aspect there is provided the process described herein, wherein the ion exchange resin comprises at least one of the following functional groups: sulphonic acid, phosphonic acid, phosphinic acid, phosphonate monoethyl/diethyl esters, phosphonic acid/tertiary amines, phosphonic acid/dimethyl ester and combinations thereof.

In still yet another aspect there is provided the process described herein, wherein the temperature of the scrubbing solution is equal to or less than 65° C.

In still yet another aspect there is provided the process described herein, wherein the temperature of the scrubbing solution is between 20° C. and 65° C.

In still yet another aspect there is provided the process described herein, wherein the scrubbing solution has a pH between 3.0 and 4.0.

In still yet another aspect there is provided the process described herein, wherein the scrubbing solution has a pH of about 3.8.

In still yet another aspect there is provided the process described herein further comprising c) regenerating the scrubbing solution from the spent carboxylate solution.

In still yet another aspect there is provided the process described herein, wherein regenerating the spent carboxylate solution comprises: c-i). precipitating metal containing solids out of the spent carboxylate solution into an alkaline solution, c-ii) separating the metal containing solids from the spent carboxylate solution so as to form a clarified carboxylate solution, and c-iii) electrodialysing the clarified carboxylate solution so as to produce a regenerated carboxylate solution.

In still yet another aspect there is provided the process described herein, wherein the alkaline solution comprises a hydroxide.

In still yet another aspect there is provided the process described herein further comprising c-iv) returning the regenerated carboxylate solution to step b) as the scrubbing solution.

DESCRIPTION OF THE DRAWINGS

Reference is now made to the accompanying figures, in which.

DETAILED DESCRIPTION

The present disclosure concerns a process for polishing at least one metal contaminant from a stock solution comprising scandium. Scandium is present in various stock solutions. In titanium feedstock upgrading processes, scandium is generally found in a stock hydrochloric acid, together with some titanium, in concentrations of about 30-40 mg/L and 300-400 mg/L respectively. In such embodiment, the stock solution, which can be used for Sc recovery, can have a mass ratio Ti/Sc of about 5 to about 50; about 5 to about 20, and about 10. In another embodiment, the stock solution can have a mass ratio Ti/Sc of about 10.

Titanium dioxide feedstock used in the chloride process for $TiO_2$ pigment production and in the production of titanium metal by the Kroll process can also be used for the recovery of scandium. In these embodiments, virtually all scandium present in the feedstock ends up in waste chloride salts. The salts can be dissolved in weak hydrochloric acid to produce a waste chloride solution, which can be neutralized, for example, using lime, to precipitate the metal impurities in the form of waste solid hydroxides. Based on typical titanium feedstock analyses, the estimated concentrate of Sc and Ti in waste chloride solutions of these two processes are 25-100 mg/L Sc and about 5 g/L Ti, prior to neutralization. In these embodiments, the waste chloride solutions, which can be potentially used for Sc recovery, have a mass ratio Ti/Sc between 50 and 200.

Titanium dioxide feedstock used in the sulphate process for $TiO_2$ pigment production can also be used for the recovery of scandium, where a waste sulphuric acid solution is produced containing about 10-50 mg/L Sc and about 2-5 g/L Ti. A typical composition of waste sulphuric acid is described in Li et al. (2018) and U.S. Pat. No. 9,102,999. In this embodiment, this sulphuric acid solution has a mass ratio Ti/Sc varying between about 100 and 400.

The present disclosure concerns a process for polishing at least one metal contaminant from a scandium stock solution. The term "polishing metal contaminants" is understood as a removal of one or more metal contaminants at low concentration in a scandium-containing solution. In an embodiment, the metal contaminants are present at a concentration of less than 1 g/L of the scandium-containing stock solution and in some further embodiments, in the range of 0.2 to 0.4 g/L in the scandium-containing stock solution. The metal contaminants that can be polished by the process described herein have physical and chemical similarities to scandium (Sc) including: titanium (Ti), thorium (Th), and zirconium (Zr). In a preferred embodiment the metal contaminant polished is titanium. Ti is similar to Sc in atomic size and properties. Sc and Ti are respectively elements 21 and 22 of the periodic table.

The process described herein includes the use of an ion exchange resin. An "ion exchange resin" is understood as a resin having an affinity for a metallic ion of interest (e.g., a scandium metallic ion) as well as for metallic ion contaminants (e.g., iron, magnesium aluminum, titanium, thorium, copper and/or zirconium). The process described herein allows using the ion exchange resin to polish the metallic ion contaminants from the metallic ion of interest.

In the present description, the stock solution is an aqueous (acidic) solution comprising scandium (Sc) and contaminants. In some embodiments, the scandium-containing stock solution can be treated to remove suspended solid particulates and reduce dissolved contaminants (especially iron (Fe), magnesium (Mg) and/or aluminum (Al)). As shown herein, contaminants such as suspended solids or high levels of dissolved ions (Fe) in a stock ion exchange solution can block passage of a non-treated solution through an ion exchange column. Therefore, a stock solution that has been treated to remove contaminants, is understood as one where the level of contaminants would not block the ion exchange resin and produce excess operating pressures. In an embodiment, the stock solution can be submitted to a (selective) solvent extraction prior to its contact with the ion exchange resin. In another embodiment, the stock solution can be submitted to a (selective) precipitation prior to its contact with the ion exchange resin. In still another embodiment, the stock solution can be placed in contact with the ion exchange resin and submitted to an acid washing step prior to the polishing step (as explained below and shown in FIG. 1).

In the first step of the polishing process, the stock solution is contacted with the ion exchange resin. The term "contacting the stock solution" is understood as bringing the solution into intimate contact with the ion exchange resin. This may be done in a variety of ways known to the skilled person in the art. In a preferred embodiment the solution is pumped through a column that retains the ion exchange resin. The contacting step allows the resin to capture scandium as well as some of the contaminants to produce a metal resin complex.

In the second step of the polishing process, the metal resin complex is scrubbed with a scrubbing solution so as to remove at least some of the contaminants and obtain a scandium ion exchange resin complex and a spent carboxylate solution. In the process of the present disclosure, the scrubbing solution has a maximal temperature of about 65° C. and in some embodiments, a temperature between about 40° C. and about 50° C. and in some further embodiments, a temperature of about 50° C.

The scrubbing solution can also a compound having at least one (and in some embodiments, more than one) carboxylate ion having a pKa in a range of 2.5 to 4. The carboxylate ion can be provided from an organic polyacid in which at least one carboxylate ion has been neutralized (deprotonated by another cation). In some embodiments, the carboxylate ion can be present in a citrate, a tartrate, malate, malonate, lactate as well as combinations thereof. In embodiments in which citrate provides the carboxylate ion, the pH of the scrubbing solution can be between about 3.0 and 4.0 and in some embodiments, between 3.0 and 3.8. In an embodiment, the pH of the scrubbing solution can be at least about 3.0, 3.1, 3.2, 3.3, 3.4, 3.5, 3.6, 3.7, 3.8 or 3.9 and/or no more than about 4.0, 3.9, 3.8, 3.7, 3.6, 3.5, 3.4, 3.3, 3.2 or 3.1.

The compound of the scrubbing solution can also include an alcohol moiety in the vicinity of the carboxylate ion.

In some embodiments, the scrubbing solution is prepared in situ prior to its application to the resin by neutralizing at least one carboxylate ion present in an organic polyacid (such as for example, citric acid, tartaric acid, malic acid, and/or lactic acid). This can be done by combining a base (NaOH, KOH or $NH_4OH$ for example) with the organic polyacid until such neutralization is achieved. In some embodiments, not all of the carboxylate moieties of the organic polyacid are neutralized. In a specific embodiment, the organic polyacid is combined with the base under conditions allowing for a single carboxylate moiety to be neutralized per organic polyacid molecule. For example, when the carboxylate ion is provided from citric acid, a solution of monosodium citrate is prepared and used as the scrubbing solution.

In some embodiments, during the scrubbing process, the carboxylate ion can bind to at least some of the contaminants present in metal ion exchange resin complex so as to allow the formation of at least a soluble metal contaminant complex. The term "soluble metal contaminant complex" refers to a complex between a metal contaminant (which necessarily excludes scandium) and the compound comprising the carboxylate ion. The soluble metal contaminant complexes are thus removed from the ion exchange resin by the flow of the scrubbing solution.

Figure 3:
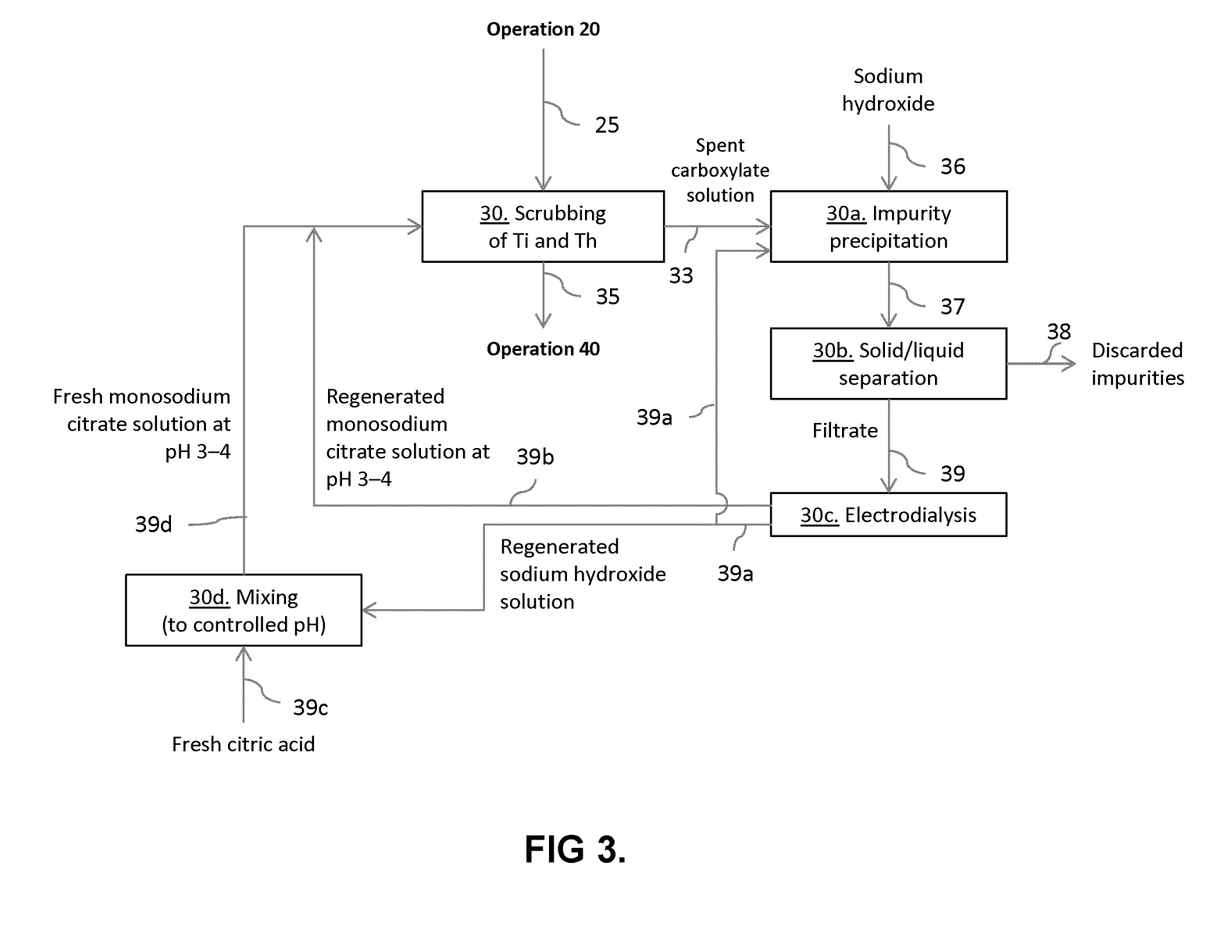
FIG. 3 is a process flow diagram of a citrate regeneration process according to one embodiment combined with the process of removing/polishing low levels of metal contaminants from an acidic solution containing scandium described herein.

Once the scrubbing step has been completed, the scandium loaded ion exchange resin can be further treated to elute scandium and obtain a purified solid scandium product. In combination or in parallel, the spent carboxylate solution can be discarded or further recycled into a scrubbing solution (as shown in FIG. 3). Briefly, the spent carboxylate solution can be recycled by precipitating the solids of the spent carboxylate solution with an alkali (a NaOH solution for example), separating the metal containing solids to clarify the carboxylate solution and electrodialysing the clarified carboxylate solution. Optionally, the regenerated carboxylate solution can be used as the scrubbing solution.

Figure 1:
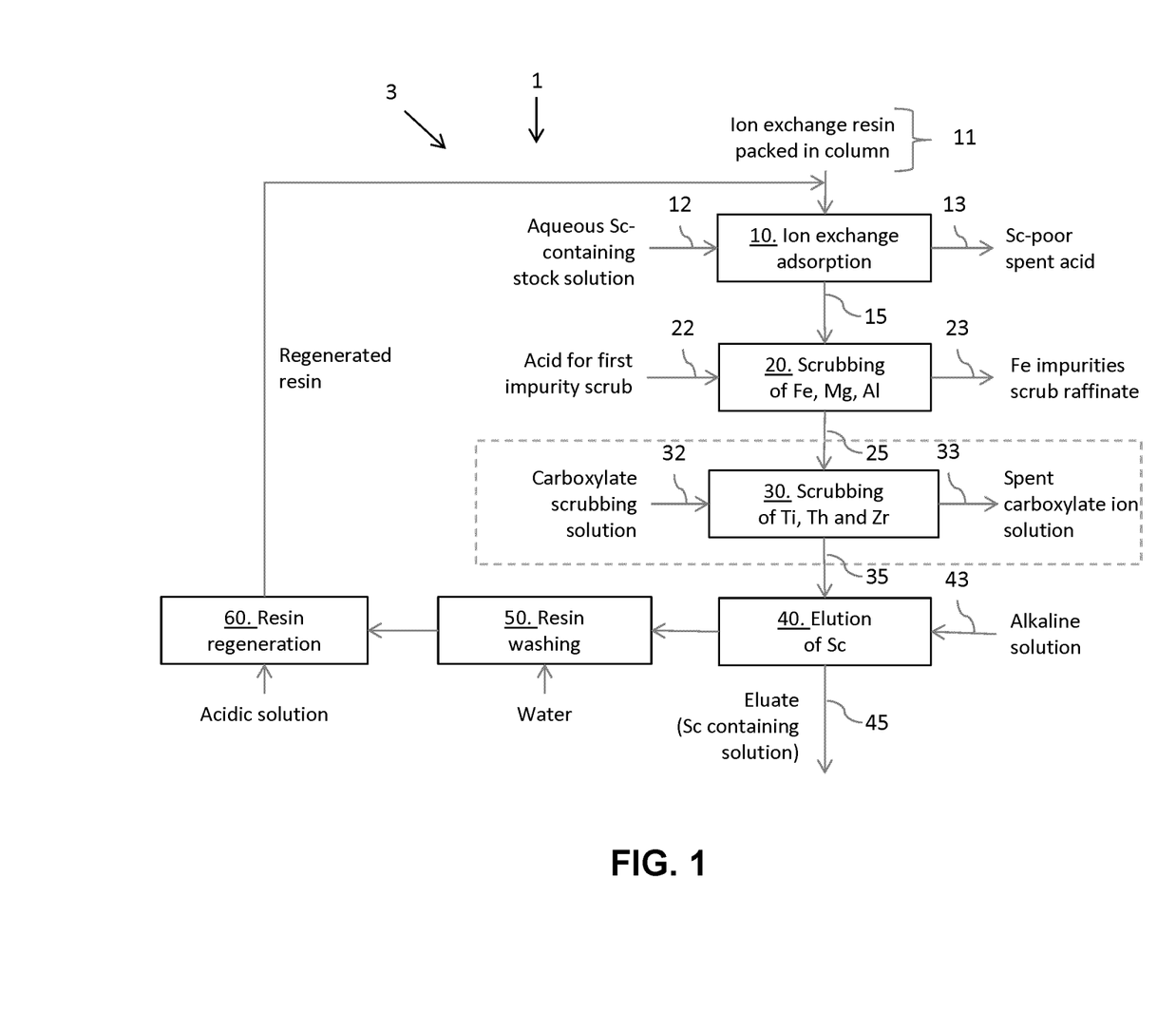
FIG. 1 is a process flow diagram of an ion exchange process according to one embodiment of a process of removing/polishing contaminants from an acidic solution containing scandium described herein.
Figure 2:
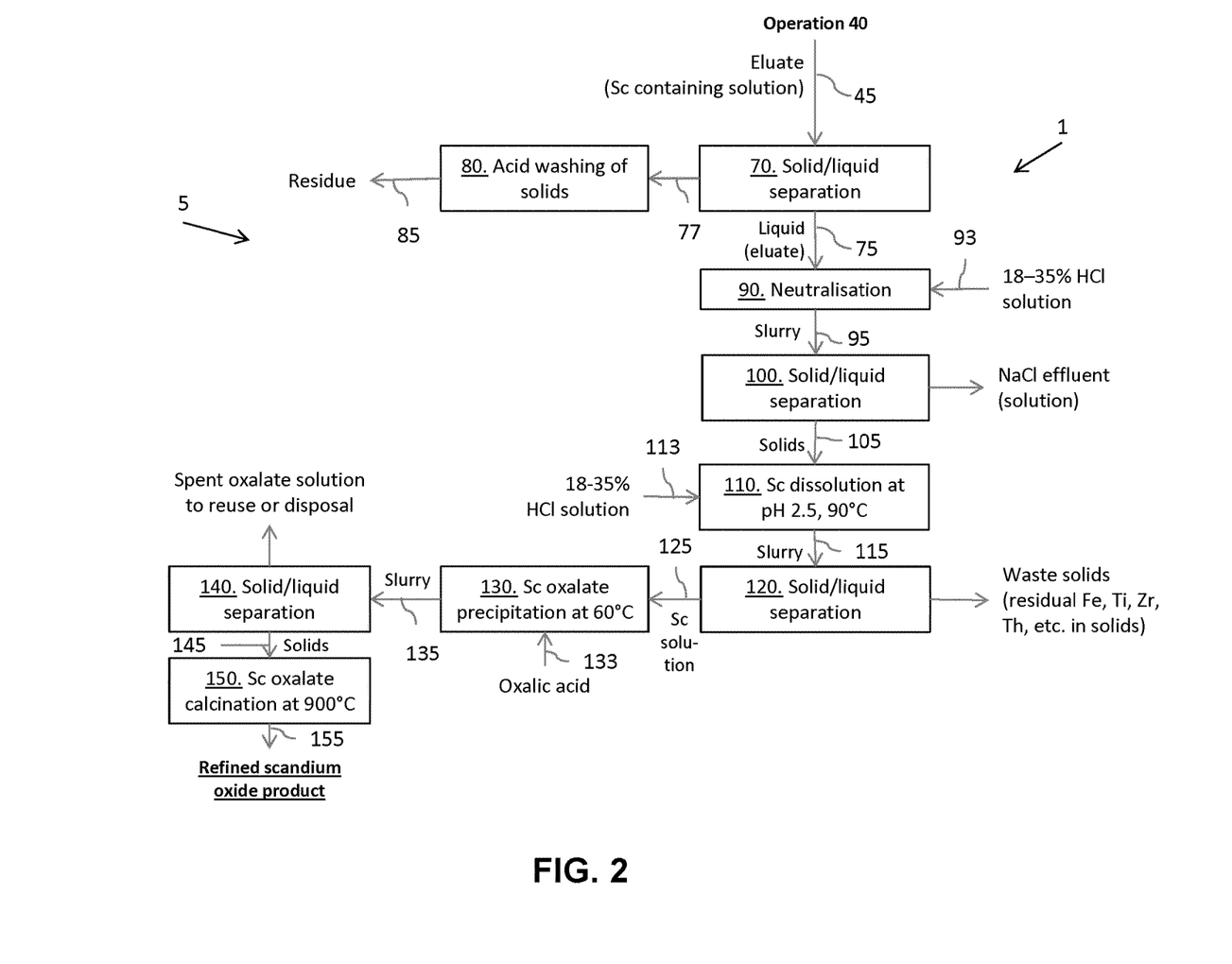
FIG. 2 is a process flow diagram of a scandium recovery process according to one embodiment combined with the process of removing/polishing low levels of metal contaminants from an acidic solution containing scandium described herein.

The attached FIGS. 1 and 2 together illustrate a process 1 for the recovery of scandium from a stock solution, where FIG. 1 relates to a process sector 3 relating to ion exchange while FIG. 2 relates to a process sector 5 relating to scandium recovery and refining.

Operation 10, ion exchange adsorption, will be described in greater details. A solid particulate ion exchange resin 11 is packed into and retained within a column. A scandium-containing stock solution 12 is passed through the column contacting the ion exchange resin 11 retained within the column. The scandium-containing stock solution 12 may be any one of a number of inorganic acids, including: hydrochloric acid (HCl), sulfuric acid ($H_2SO_4$), phosphoric acid ($H_3PO_4$), nitric acid ($HNO_3$), and combinations thereof each capable of extracting scandium. In a preferred embodiment, the stock solution comprises or is hydrochloric acid that is derived from upgrading of titanium dioxide feedstock (ilmenite, titania slag, etc.), or waste acid produced upon converting titanium dioxide feedstock to titanium dioxide pigment or to titanium metal. The ion exchange resin adsorbs scandium (Sc), as well as many other elements such as: iron (Fe), titanium (Ti), zirconium (Zr), thorium (Th), magnesium (Mg), aluminum (Al), calcium (Ca) considered here as "metal contaminants".

The ion exchange resin 11 includes at least one functional group selected from the group consisting of sulphonic acid, phosphonic acid, phosphinic acid, phosphonate monoethyl/diethyl esters, phosphonic acid/tertiary amines, phosphonic acid/dimethyl ester, and combinations thereof.

Puralite® S957 is marketed as macroporous chelating resin and is an embodiment of the ion exchange resin. The Puralite® resin has two functional groups: sulphonate cation exchange sites (—$SO_3H$) and phosphonate chelating sites (—$PO(OH)_2$), as shown in Formula 1.

Formula 1

Without wanting to be bound by any theory, it is assumed in the stock solution 12, that scandium, titanium and thorium exist in the form of ions $Sc^{3+}$, $TiO_2^+$ and $Th^{4+}$ respectively. This assumption is supported by literature data on the speciation of Sc, Ti and Th in acidic chloride solutions (Wood et al., 2006; Comba et al. 1987; Buettner et al., 2012; and Zebroski et al., 1951).

The sulphonate groups can exchange protons ($H^+$) with metal ions ($M^{n+}$) as per Reaction (1):

Reaction (1)

where (r) indicates a species on the resin surface, and (aq) a species in the bulk aqueous solution.

This is believed to be a mechanism by which $Fe^{3+}$, $Al^{3+}$, $Mg^{2+}$ and $Ca^{2+}$ are attached to the resin. Therefore, by passing a stronger acid solution, such as concentrated regenerated hydrochloric acid or purchased clean hydrochloric acid, through the resin, some of the contaminants (especially Fe) are substantially removed from the resin.

By contrast, phosphonate groups form somewhat different bonds with aqueous metal ions.

In weak acid solutions, the adsorption with the phosphonate group can be generalized by Reactions (2) and (3):

Reaction (2)

Reaction (3)

In strong acid solutions, metal ions can form strong coordination complexes with the oxygen of the P═O bond of the phosphoryl group as generalized by Reaction (4):

Reaction (4)

For some metal ions, the bond between the phosphonate group and the metal cation may be so strong that it cannot be reversed by just increasing the solution acidity, i.e., by reversing Reactions (2), (3) or (4). Ions $Sc^{3+}$, $TiO^{2+}$, $Th^{4+}$ and probably $ZrO^{2+}$ likely form such strong complexes with the phosphonate groups, and cannot be removed by strong acid wash. It appears that to break the phosphonate-metal bonds another stronger aqueous complexation agent is required.

As such, Operation 10 of ion exchange adsorption produces two process streams: a scandium poor stock acid 13 ("extraction raffinate") that leaves the column, and a resin 15 within the column retaining scandium, and some metal ion impurities such as Fe, Mg, Al, Ca, Ti, Th, Zr, etc.

Returning to FIG. 1, Operation 20 ("scrubbing of Fe, etc.") is a first optional scrubbing operation within the ion exchange resin 11, where bulk/excess metal ions (Fe, Mg, Al, Ca, etc. likely removed in accordance with Reaction (1)) found in the stock solution 12 and associated on the resin 15 are removed. This first bulk scrub of the resin 15 is with a strong acid 22, preferably HCl. This first impurity scrub acid 22, may be an impure acid and preferably has a concentration of 10 to 25 wt % HCl. Therefore, first scrub acid 22 is in a common range of concentration for a regenerated acid. The first scrub acid 22 is believed to protonate the sulphonate group releasing the bulk ion Fe, Mg, Al, Ca, and other impurities (as well as some Sc, Ti, Th and Zr ions) from the resin 11. This first scrub acid 22 leaves the column via a Fe impurities scrub raffinate solution 23 containing the dissolved Fe impurities. The first scrubbing Operation 20 provides a resin 25, within the column that is applicable to the polishing contaminant process herein described.

After Operation 20, scandium and any remaining like-metal (Ti, Th and Zr) impurity complex/complexes remain on the resin 25, likely associated with the phosphonate groups. In the polishing process (Operation 30: "scrubbing of Ti, etc."), a carboxylate scrubbing solution 32 is added to the column and is or comprises a salt. In a preferred embodiment, the carboxylate scrubbing solution 32 comprises or is a monosodium citrate solution having a pH from 3.0 to 4.0 (and in some embodiments, a pH of 3.8) and at a temperature between ambient and 65° C. (and in some embodiments, at 50° C.). The carboxylate scrubbing solution 32 is intended to remove most of the adsorbed like-metal (Ti, Th and Zr) impurities from the resin, but not scandium. The carboxylate scrubbing solution 32 leaves the column via spent carboxylate ion solution 33 containing the dissolved adsorbed-like metal and provides resin 35.

Without wishing to be bound to theory, titanium can form strong aqueous complexes with citrate ions. For example, the $[Ti(Hcit)_3]^{2-}$ complex anion (where "cit" is the citrate anion $C_6H_5O_7^{3-}$) is dominant at pH 3 to 4. The titanium scrubbing operation can be understood on the basis of Reaction (5):

Reaction (5)

Monosodium citrate ($NaH_2cit$) solution can be prepared by neutralizing a citric acid ($H_3cit$) solution to pH 3 to 4, and preferably at pH 3.8. The stoichiometric ratio of titanium (Ti) to citrate (cit) in the above titanium scrubbing reaction is equal to 3.

It is speculated that thorium can form strong soluble citrate complexes at pH about 3.8. Therefore, a significant percentage of thorium can also be scrubbed when the loaded resin is washed with monosodium citrate solution and this is more evident as an increase in the scrubbing temperature from ambient to about 50° C., or even higher depending on the resin's thermal stability limits is applied.

In the process shown on FIG. 1, scandium can optionally be stripped off the resin (step 40: "elution") with an alkaline aqueous solution 43, typically a solution of sodium carbonate, sodium bicarbonate, sodium hydroxide, potassium carbonate, potassium bicarbonate, potassium hydroxide, ammonium carbonate, ammonium bicarbonate, ammonium hydroxide in a concentration range of 5 to 20% by wt., and, in some embodiments, a solution of sodium carbonate at a concentration of about 15% wt. The aqueous alkaline solution 43 leaves the column with the eluate 45 (containing scandium).

In optional Operations 50 and 60, the resin stripped by the alkaline solution can be washed with water and regenerated with fresh hydrochloric acid (for example, 5 to 15% wt. HCl) to be used again at the adsorption stage (Operation 10).

Without wishing to be bound to theory, scandium is known to be easily removed from Sc-loaded ion exchange resins by the use of sodium carbonate solutions. In excess of sodium carbonate, the mechanism may be safely assumed to be:

$$2(R''\text{—}PO_2(OH)_2Sc^{3+})(r)+7Na_2CO_3(aq) \rightleftharpoons 2(R''\text{—}PO_2(ONa)_2)(r)+Sc_2(CO_3)_3 \cdot 4Na_2CO_3(aq)+2Na^+(aq)+4H^+(aq)$$

Reaction (6)

Once scandium has been eluted from the column, it can be further purified as shown in FIG. 2. The scandium-containing "eluate" 45, which is still rather alkaline, can be filtered or centrifuged (Operation 70: solid/liquid separation) to remove any entrained solids (residual compounds formed by metal ion hydrolysis). The solids 77 from Operation 70 can be washed and neutralized with some acid and discarded as residue 85 (Operation 80). The scandium-containing "eluate" 75 after Operation 70 is substantially unchanged from the eluate 45. The eluate 75 can be neutralized (at pH 6.5 for example) with strong acid 93 (for example, 18 to 35 wt % HCl) in Operation 90 to precipitate solid crude (impure) scandium hydroxide/carbonate/bicarbonate 95. The solid crude scandium precipitate 95 can be washed and recovered by solid/liquid separation (Operation 100) as a washed solid crude (impure) scandium hydroxide/carbonate 105. In Operation 110, scandium can be leached out from the crude scandium precipitate 105 with an acid solution 113 (18 to 35 wt % HCl) preferably at pH 2.5 and at 90° C. The product of Operation 110 is a slurry 115 made of a scandium-containing leachate and non-dissolved solids. After a further solid-liquid separation (Operation 120), a scandium leach solution 125 is obtained. The solution 125 can be treated with oxalic acid 133 to precipitate scandium oxalate crystals in slurry 135 (Operation 130). The scandium oxalate crystals 145 can be recovered by filtration (Operation 140), and they are finally calcined for few hours at about 900° C. to a scandium oxide product 155 (Operation 150).

The skilled person in the art appreciates that the final purity of the scandium oxide product 155 is directly affected by the initial purity of the scandium eluate 45 entering the purification. The process described herein increases the final purity of the scandium oxide product by increasing the purity of the scandium eluate.

FIG. 3 illustrates a further benefit of the present scandium polishing process when monosodium citrate is used as the scrubbing solution and particularly how monosodium citrate can be regenerated by electrodialysis, giving an important cost advantage to the present process. The spent carboxylate (citrate) ion solution 33 obtained from Operation 30 can be precipitated with sodium hydroxide 36 (in Operation 30a). The impurities slurry 37 can be separated in Operation 30b with discarded impurities 38 including titanium separated from the citrate aqueous phase 39 (filtrate) that is electrodialyzed in Operation 30c. After pH mixing and control, the sodium citrate solution 39b is ready for return to Ti scrubbing Operation 30 as a regenerated carboxylate scrubbing solution 39b. The regenerated sodium hydroxide solution 39a can either be returned to Operation 30a or be admixed, at Operation 30d, with (fresh) citric acid 39c to form fresh monosodium citrate solution 39d, which can be used as a carboxylate scrubbing solution 32.

Example 1

Operation 10—Ion Exchange Adsorption

A glass column of dimensions 61 cm (24 in) height by 2.54 cm (1 in) internal diameter was filled with 250 mL of Puralite® S957 resin to treat a stock solution of hydrochloric acid from a TiO₂ slag upgrading plant.

The stock solution 12 had been pre-filtered to remove any suspended solids of size greater than 5 μm. After pre-filtration, the stock solution ("feed solution") 12 was pumped through the resin-filled column for the adsorption of scandium. In one adsorption test, the flowrate of the stock solution 12 passing through the column was kept constant at 1.32 L/h or 5.28 bed volumes per hour (BV/h), with a peristaltic pump. The column was heated with hot water to 55° C. Samples were taken from the outflow at different time intervals to analyse for different elements. Further, the scandium poor stock acid 13 (here specified the total extraction raffinate) leaving the column ("extraction raffinate") was collected and analysed. Table 1 gives the analysis of the feed solution (the Sc containing stock acid) 12 and the total extraction raffinate 13 after 200 BV (50 L).

TABLE 1

| Stream | Fe | Mg | Al | Ca | Cr | Mn | Ti | Sc | Zr | Th | U |
|---|---|---|---|---|---|---|---|---|---|---|---|
| Feed solution | 32 | 19 | 6.1 | 1.1 | 409 | 1090 | 359 | 41 | 1.0 | 0.9 | BDL |
| Extr. raffinate | 31 | 19 | 6.2 | 1.0 | 402 | 1080 | 278 | 20 | 0.6 | BDL | BDL |

BDL: below detection limit.

As shown in Table 1, the resin has great affinity for scandium (Sc), zirconium (Zr), titanium (Ti) and thorium (Th). It also exhibits considerable affinity for iron (Fe).

Operation 20—Scrubbing of Iron

The resin loaded with scandium and other metal ions from the Operation 10 was treated sequentially with two types of acid for first impurities scrub stream 22 as previously described, first with 2 L (8 BV) of industrially regenerated 18% wt. hydrochloric acid ("scrub feed 1") and then with 1 L (4 BV) clean 18% wt. hydrochloric acid ("scrub feed 2") so as to verify whether some iron adsorbed on the resin could be removed. The temperature of the scrubbing tests was 55° C., and the flowrate was constant at 0.66 L/h (2.64 BV/h). Table 2 below gives the analysis of the scrub feed solutions and that of the accumulated scrub effluents ("scrub raffinate 1" and "scrub raffinate 2").

TABLE 2

| | g/L | | | | mg/L | | | | | | |
|---|---|---|---|---|---|---|---|---|---|---|---|
| Stream | Fe | Mg | Al | Ca | Cr | Mn | Ti | Sc | Zr | Th | U |
| Scrub feed 1 | 4.7 | 2.4 | 0.8 | 0.2 | 53 | 164 | 49 | 5 | 0.1 | BDL | BDL |
| Scrub raffinate 1 | 7.6 | 4.2 | 1.3 | 0.28 | 100 | 267 | 416 | 18 | 0.1 | 0.2 | BDL |
| Scrub feed 2 | BDL | BDL | BDL | BDL | BDL | BDL | BDL | BDL | BDL | BDL | BDL |
| Scrub raffinate 2 | 0.6 | 0.2 | 0.1 | 0.02 | 8 | 17 | 98 | 8 | BDL | BDL | BDL |

BDL: below detection limit.

As shown in Table 2, some adsorbed iron and about 10% of adsorbed titanium were removed. The exact percentage of scrubbed iron could not be estimated due to inaccuracies in the analysis of iron. However, tests on the subsequent process steps (Operations 30-150) showed that Operation 20 prevented effectively any contamination of the final scandium oxide product by iron.

Operation 30—Scrubbing of Titanium, Thorium and Zirconium

After acid scrubbing Operation 20, the resin of Example 1 was washed with 1.5 L (6 BV) deionized water at constant flowrate 2.64 L/h (10.56 BV/h) and ambient temperature. Then, the washed resin was treated with a carbon/late scrubbing solution 32 of monosodium citrate to remove most of adsorbed titanium. The monosodium citrate solution was prepared in advance from a 15% wt. citric acid solution neutralized with sodium hydroxide to pH 3.8. In total 2.5 L (10 BV) of monosodium citrate solution was pumped though the column, at constant flowrate 0.66 L/h (2.64 BV/h) and ambient temperature. Table 3 below gives the composition of the accumulated titanium scrub effluent 33 ("scrub raffinate 3").

TABLE 3

| | mg/L | | | | | | | | | | |
|---|---|---|---|---|---|---|---|---|---|---|---|
| Stream | Fe | Mg | Al | Ca | Cr | Mn | Ti | Sc | Zr | Th | U |
| Scrub raffinate 3 | 6.9 | 2.5 | 1.1 | 0.0 | 0 | 0 | 416 | 11 | 1.5 | 3.7 | BDL |

BDL: below detection limit.

As shown in Table 3, some titanium (about 25% by wt.) was removed. Some thorium and some zirconium, which had accumulated on the column virtually undetected, were also removed.

In another similar experiment, scrubbing was repeated with another carboxylate scrubbing solution 32 having 15% wt. monosodium citrate heated at 50° C. All other conditions remained the same. The results given in Table 4 below clearly show that higher temperatures provide better scrubbing of titanium, thorium and zirconium ions. Titanium in particular is totally removed from the resin.

TABLE 4

| | mg/L | | | | | | | | | | |
|---|---|---|---|---|---|---|---|---|---|---|---|
| Stream | Fe | Mg | Al | Ca | Cr | Mn | Ti | Sc | Zr | Th | U |
| Scrub raffinate 3 | 95 | 2.8 | 26 | 0.0 | 0 | 0 | 2363 | 6.4 | 8.0 | 13.9 | BDL |

BDL: below detection limit.

Operation 40—Elution of Scandium

After scrubbing with monosodium citrate solution, the resin was washed with 1.5 L (6 BV) deionised water at constant flowrate 2.64 L/h (10.56 BV/h) and ambient temperature (Operation 40). After washing with water, the resin was treated with a solution containing 15% wt. sodium carbonate. In total, 1.25 L (5 BV) of sodium carbonate solution was pumped though the column, at constant flowrate 1.98 L/h (7.92 BV/h) and ambient temperature.

Table 5 provides the composition of the accumulated Sc effluent 45 that is rich in scandium ("eluate"), when scrubbing of titanium, thorium and zirconium (Operation 30) was done at room temperature (about 25° C.).

TABLE 5

| | mg/L | | | | | | | | | | |
|---|---|---|---|---|---|---|---|---|---|---|---|
| Stream | Fe | Mg | Al | Ca | Cr | Mn | Ti | Sc | Zr | Th | U |
| Eluate | 3.4 | 2.4 | 1.1 | BDL | 1.1 | BDL | 826 | 682 | 8.7 | 6.7 | BDL |

BDL: Below detection limit.

From Table 5, it is estimated that about 95% of scandium or more was recovered in the eluate. The results also showed that the eluate contained some titanium and some zirconium not scrubbed in previous Operation 30.

Example 2

Operation 30—Scrubbing of Titanium, Thorium and Zirconium at Elevated Temperatures with More Concentrated Monosodium Citrate Solution Table 6 shows the comparative composition of the cumulative spent carboxylate ion solution 33, when scrubbing of titanium, thorium and zirconium was done at 50° C. and at room temperature (25° C.), with 20% wt. monosodium citrate solution at pH 3.5.

TABLE 6

| Scrubbing conditions | mg/L | | | | | | | | | | |
|---|---|---|---|---|---|---|---|---|---|---|---|
| | Fe | Mg | Al | Ca | Cr | Mn | Ti | Sc | Zr | Th | U |
| 20% NaH₂Cit, 25° C. | BDL | BDL | 0.2 | BDL | BDL | BDL | 654 | 3.2 | BDL | 5.4 | BDL |
| 20% NaH₂Cit, 50° C. | 70 | BDL | 16 | BDL | BDL | BDL | 2524 | 7.5 | 7.6 | 17.9 | BDL |

BDL: Below detection limit

As evident from Table 6, when the second scrubbing (Operation 30) was carried out with relatively hot carboxylate scrubbing solution 32 of monosodium citrate, the amount of titanium, zirconium and thorium removed from the resin was much higher.

Operations 50 and 60—Resin Washing and Regeneration

After elution, the resin was rinsed one last time with deionized water at ambient temperature. Finally, the resin was treated with 10% wt. hydrochloric acid (HCl) solution, to restore its active ingredient and reactivate the resin to use it again for scandium recovery in another adsorption-scrubbing-elution cycle.

Example 3

Operation 40—Elution of Scandium without Prior Scrubbing of Titanium, Thorium and Zirconium After acid scrubbing (Operation 20), the resin was washed with 1.5 L (6 BV) deionised water at constant flowrate 2.64 L/h (10.56 BV/h) and ambient temperature. After washing with water, the resin was not subjected to another scrubbing, but it was immediately treated with an alkaline solution 43 containing 15% wt. sodium carbonate, so as to elute the scandium that was adsorbed on the resin.

During the elution, it was observed that a white precipitate was formed inside the column. The precipitate became very dense to the point that visible clots were formed. Eventually the column was blocked, and the elution had to be aborted. By analysing the aqueous solution that had percolated through the resin, it was deduced that the solidified clots were rich in titanium.

Example 4

Operations 30a to 30d—Regeneration of Monosodium Citrate Solution

About 25 L of scrub raffinate 23 collected from Operation 30 was treated with sodium hydroxide 36 to raise its pH to about 12, and in this way to precipitate titanium and other impurities in the form of solid hydroxides (Operation 30a). The resulting impurities slurry 37 was filtered, and the impurity-containing solids were discarded 38 (Operation 30b).

Sixteen liters (16 L) of the filtrate were used as anolyte for an electrodialysis test (Operation 30c) in an electrolytic setup. Sodium hydroxide solution (8 L at 17 g/L NaOH) was used as catholyte in the same setup. The electrolytic setup consisted of (a) twelve compartments separated by alternating cation-exchange membranes and bipolar membranes, (b) a stainless steel cathode at one end, and (c) a dimensionally stable anode (DSA) made of platinum/iridium-coated titanium at the other end. Each membrane had an active area of 380 cm². Both the anolyte and the catholyte were recirculating in closed loops between their reservoirs and their respective electrolytic compartments.

The test lasted for about 1 h and 55 min. A concentrated solution of sodium hydroxide (8 L at 116 g/L NaOH) was produced at the cathodic side, and a concentrated solution of monosodium citrate (153 g/L citrate at pH 3.8) was produced at the anodic side. The current density was 150 mA/cm² (1500 A/m²). The current efficiency for the production of monosodium citrate was found equal to 81%, and that for the production of sodium hydroxide 85%, with an estimated energy consumption of 1.63 kWh/kg monosodium citrate and 2.60 kWh/kg sodium hydroxide. The overall reaction can be written in a simplified form as follows:

Reaction (7)

$$Na_3cit + 2H_2O \xrightarrow{electrodialysis} NaH_2cit + 2NaOH$$

The regenerated monosodium citrate scrubbing solution 32 was used in titanium and thorium scrubbing (Operation 30), while the regenerated sodium hydroxide was used for impurity precipitation of scrub raffinate 33 (Operation 30a), and in the production of fresh (make up) monosodium citrate solution by mixing with fresh citric acid solution to a terminal pH of 3.8.

The test of Example 3 showed that at least 50% of monosodium citrate and sodium hydroxide can be regenerated in just about 2 hours. This gives a significant cost advantage to scrubbing with monosodium citrate (i.e., the invention).

The above description is meant to be exemplary only, and one skilled in the art will recognize that changes may be made to the embodiments described without departing form the inventions disclosed. Still other modifications which fall within the scope of the present invention will be apparent to those skilled in the art, in light of a review of this disclosure and such modifications are intended to fall within the appended claims.

REFERENCES

Y. Li et al., *Hydrometallurgy*, vol. 178 (2018).

U.S. Pat. No. 9,102,999.

S. A. Wood et al., *Ore Geol. Rev.*, vol. 28 (2006), pp. 57-102.

P. Comba and A. Merbach, *Inorg. Chem.*, vol 26 (1987), pp. 1315-1323.

K. M. Buettner and A. M. Valentine, *Chem. Rev.*, vol. 112 (2012), pp. 1863-1881.

E. L. Zebroski et al., *Am. Chem. Soc.*, vol. 73 (1951), pp. 5646-5650.

The invention claimed is:

1. A process for polishing at least one metal contaminant from a stock solution comprising Sc, wherein the at least one metal contaminant is titanium (Ti), thorium (Th), or zirconium (Zr), the process comprising:
   a) contacting the stock solution with an ion exchange resin capturing Sc and the at least one metal contaminant so as to produce a metal ion exchange resin complex, and
   b) scrubbing the metal ion exchange resin complex with a scrubbing solution comprising a salt having a carboxylate ion having a pKa in a range of 2.5 to 4.0, so as to produce a Sc ion exchange resin complex and a spent carboxylate solution.

2. The process according to claim 1, wherein the salt comprises an alcohol moiety in addition to the carboxylate ion.

3. The process according to claim 1, wherein the carboxylate ion is capable of binding the at least one metal contaminant so as to produce a soluble metal contaminant complex.

4. The process according to claim 1, wherein prior to step a), the process comprises steps of:
   a-i) providing a first solution comprising Sc and the at least one metal contaminant and excess metal ions;
   a-ii) contacting the first solution with the ion exchange resin;
   a-iii) adding a strong acid to the ion exchange resin to dissolve and remove the excess metal ions from the ion exchange resin as an excess metal ion acid solution; and
   a-iv) forming the stock solution.

5. The process according to claim 4, wherein the excess metal ions comprise at least one of iron (Fe), magnesium (Mg), aluminum (Al), calcium (Ca) and combinations thereof.

6. The process according to claim 5, wherein the excess metal ions comprise Fe.

7. The process according to claim 1, further comprising eluting Sc from the ion exchange resin complex with an alkaline solution producing a soluble Sc solution.

8. The process according to claim 7, wherein the alkaline solution comprises a hydroxide, a carbonate, or a bicarbonate.

9. The process according to claim 1, wherein the at least one metal contaminant is Ti.

10. The process according to claim 1, wherein the salt is at least one of citrate, tartrate, malate, malonate, lactate and combinations thereof.

11. The process according to claim 10, wherein the salt is citrate.

12. The process according to claim 1, wherein the ion exchange resin comprises at least one of the following functional groups: sulphonic acid, phosphonic acid, phosphinic acid, phosphonate monoethyl/diethyl esters, phosphonic acid/tertiary amines, phosphonic acid/dimethyl ester and combinations thereof.

13. The process according to claim 1, wherein a temperature of the scrubbing solution is equal to or less than 65° C.

14. The process according to claim 13, wherein the temperature of the scrubbing solution is between 20° C. and 65° C.

15. The process according to claim 1, wherein the scrubbing solution has a pH between 3.0 and 4.0.

16. The process according to claim 1, wherein the scrubbing solution has a pH of about 3.8.

17. The process according to claim 1 further comprising:
   c. regenerating the scrubbing solution from the spent carboxylate solution.

18. The process according to claim 17, wherein regenerating the spent carboxylate solution comprises:
   c-i) precipitating metal containing solids out of the spent carboxylate solution into an alkaline solution,
   c-ii) separating the metal containing solids from the spent carboxylate solution so as to form a clarified carboxylate solution, and
   c-iii) electrodialysing the clarified carboxylate solution so as to produce a regenerated carboxylate solution.

19. A process for polishing at least one of titanium (Ti), thorium (Th), and zirconium (Zr) from a stock solution comprising Sc, the process comprising:
   a) contacting the stock solution with an ion exchange resin capturing Sc, and the at least one of Ti, Th, and Zr to produce a metal resin complex, and
   b) scrubbing the metal resin complex with a scrubbing solution comprising a salt having a citrate ion and a pH between 3.0 and 4.0, so as to produce a Sc ion exchange resin complex and a spent carboxylate solution.

* * * * *